Nov. 18, 1930.  W. W. SHOEMAKER  1,781,863
CUTTING TOOL
Filed March 22, 1928
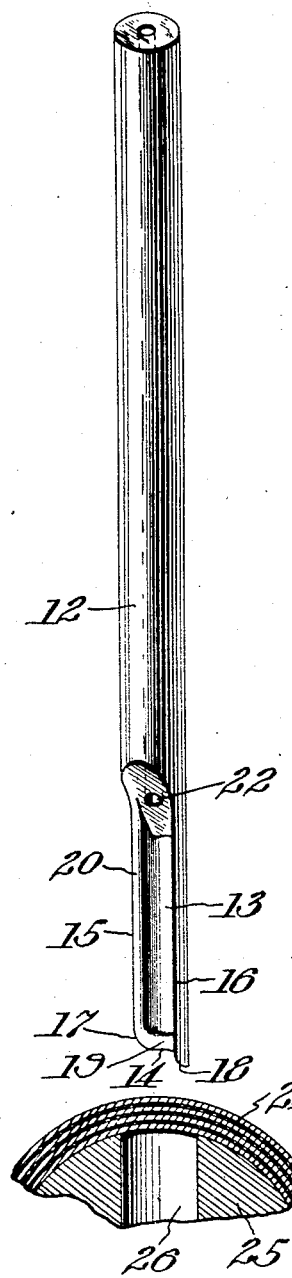
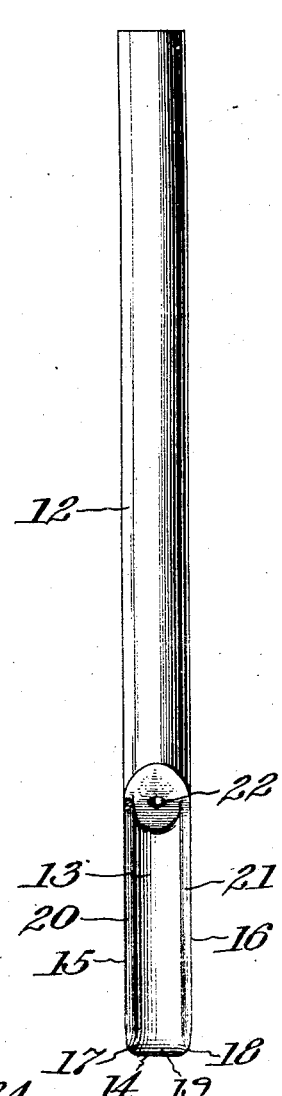
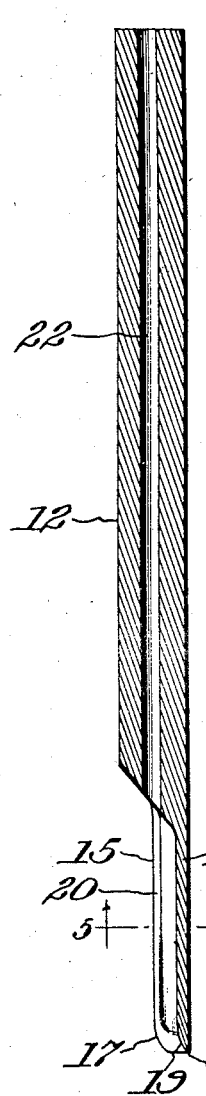
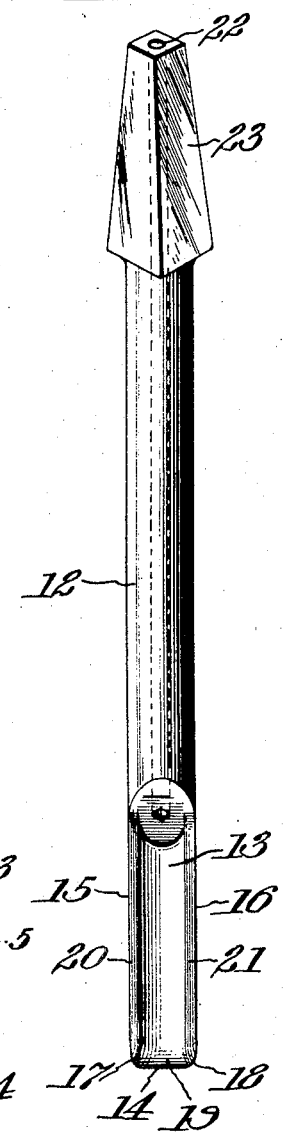
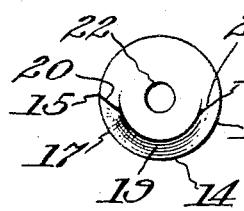
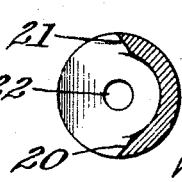
INVENTOR:
William W. Shoemaker.
BY
Church & Church
His ATTORNEYS.

Patented Nov. 18, 1930

1,781,863

UNITED STATES PATENT OFFICE

WILLIAM WALTER SHOEMAKER, OF NEW YORK, N. Y.

CUTTING TOOL

Application filed March 22, 1928. Serial No. 263,756.

This invention relates to rotary cutting tools, and particularly to a tool adapted to bore holes in rubber hose, tires and similar soft rubber articles having laminated fabric therein. The formation of holes in such articles by a punching operation effects an opening which is distorted from a true circle, is larger at one side of the sheet than at the other, and also leaves a rough inner wall because of torn, uncut strands of the fabric, so that it has heretofore been necessary to clean the hole by a searing operation. This is objectionable, not only because of the added time required, but also because of the destructive effect upon the rubber. Attempts to bore holes in such articles, by the use of the rotary cutting tools heretofore known, have resulted in tearing the rubber adjacent the opening and likewise in shredding the fabric strands.

One of the objects of the invention is to provide a rotary cutting tool which will cut a clean hole in soft rubber and avoid the disadvantageous results described above, thus rendering any cleaning operation unnecessary. Another object is to provide such a tool by which the holes can be quickly made, regardless of the shape or thickness of the work. Still further objects of the invention and the novel features of the tool will be evident from the following description when read in conjunction with the accompanying drawings, in which:

Figure 1 is a view in perspective of a tool embodying the invention, a mandrel and the material worked upon being indicated in section;

Fig. 2 is a view in elevation of the tool shown in Fig. 1;

Fig. 3 is a view in vertical medial section of the tool shown in Fig. 2;

Fig. 4 is a view in end elevation of the tool shown in Fig. 2;

Fig. 5 is a view in cross-section taken on line 5—5 of Fig. 3; and

Fig. 6 is a view in perspective of a slightly modified form of tool.

As shown in the drawings, the tool 11 comprises a shank portion 12 and a semi-cylindrical portion 13, the shank being preferably of the same diameter as the cutting portion. Upon the semi-cylindrical cutting portion 13 there are formed an arcuate end cutting edge 14, straight parallel side-cutting edges 15 and 16, and curved intermediate cutting edges 17 and 18 between the straight side-cutting edges and the end cutting edge, and continuous with them. The cutting edges taken together therefore form in effect a continuous cutting edge lying entirely in the surface of the cylinder of the cutting portion 13, and having diametrically opposed portions 15 and 16 parallel to the axis of the cylinder, an arcuate end portion 14 in a plane perpendicular to the axis of the cylinder and short curved intermediate portions 17 and 18. The cutting edge 14 is a true arc of a circle of approximately 120 degrees, and the curved intermediate cutting edges 17 and 18, as shown in Fig. 3, have greater axial extent than circumferential extent.

The inner surface adjacent the end cutting edge 14 is preferably slightly rounded, as indicated at 19, while the inner surfaces 20 and 21, adjacent the side cutting edges 15 and 16, may be flat or slightly hollowed, if desired. At the lower corners, adjacent the intermediate cutting edges 17 and 18, the rounded surface 19 is preferably gradually flattened to merge into the flat or hollow surfaces 20 and 21, without leaving a rib or sharp projection where such surfaces meet.

Since any cutting operation upon rubber is facilitated by keeping the tool wet, it is preferable to provide an axial bore 22 through which water or other liquid may be supplied; and as shown in Fig. 6, the shank 12 may be formed with a squared end 23, if desired, to facilitate the mounting and rotation of the tool. As shown in Fig. 1, the work 24 is preferably supported on a suitable mandrel 25, which is perforated as shown at 26 to receive the tool.

The tool may be conveniently formed from a piece of cylindrical stock by counter-boring the cutting end to leave a cylindrical wall of the desired thickness. One half of the counter-bored end may be then removed, and the surfaces 20 and 21 may be ground, simultaneously, if desired, by a grinding tool rotating on an axis parallel to the axis of the shank 12. After the curved surface 19 is ground to form the end-cutting edge 14, which will be initially semi-circular, the intermediate cutting edges 17 and 18 may be formed by grinding the corners to gradually merge the curve of the surface 19 into the flat or slightly hollowed surfaces 20 and 21.

The use of the tool is identical with the use of any rotary cutting tool. It is not in any sense a punch and functions in a manner quite distinct from that of a punch, all of the cutting edges 14, 15, 16, 17 and 18 being operated as and acting as cutting edges when the tool is rotated. By its use clean-cut holes of true circular form and of uniform diameter can be cut in soft rubber articles, whether such articles have laminated fabric therein or not, the tearing of the rubber is obviated, and the fabric strands will be cut where they intersect the wall of the opening without leaving projecting frayed ends.

While a single embodiment of the invention has been shown and described it will be understood that many changes may be made in the dimensions and proportions of the various parts of the tool and are intended to be included in the scope of the following claims which define the invention.

What is claimed is:

1. A rotary cutting tool comprising a cutting portion of arcuate cross section and having a semi-cylindrical outer surface, said cutting portion having a lateral cutting edge parallel to the axis of the cylindrical surface, an end cutting edge in a plane perpendicular to the axis of the cylindrical surface and a curved intermediate cutting edge joining the end cutting edge and the lateral cutting edge.

2. A rotary cutting tool comprising a cutting portion of arcuate cross section and having a substantially semi-cylindrical outer surface, said cutting portion having a lateral cutting edge, an end cutting edge in a plane perpendicular to the axis of the cylindrical surface and a curved intermediate cutting edge joining said cutting edges, the radius of curvature of the intermediate cutting edge increasing gradually from the end cutting edge to the lateral cutting edge.

3. A rotary cutting tool comprising a cutting portion of arcuate cross section and having a substantially semi-cylindrical outer surface, said cutting portion having an end cutting edge along the line defined by the intersection of a plane and the cylindrical surface, and having a curved cutting edge extending axially and circumferentially away from one end of said end cutting edge, the radius of curvature of said curved cutting edge gradually increasing from the point at which it is tangent to the end cutting edge.

WILLIAM WALTER SHOEMAKER.